Nov. 25, 1947.  F. C. FRANK  2,431,667
BRAKE FOR AIRPLANE WHEELS
Original Filed March 8, 1940  2 Sheets-Sheet 1
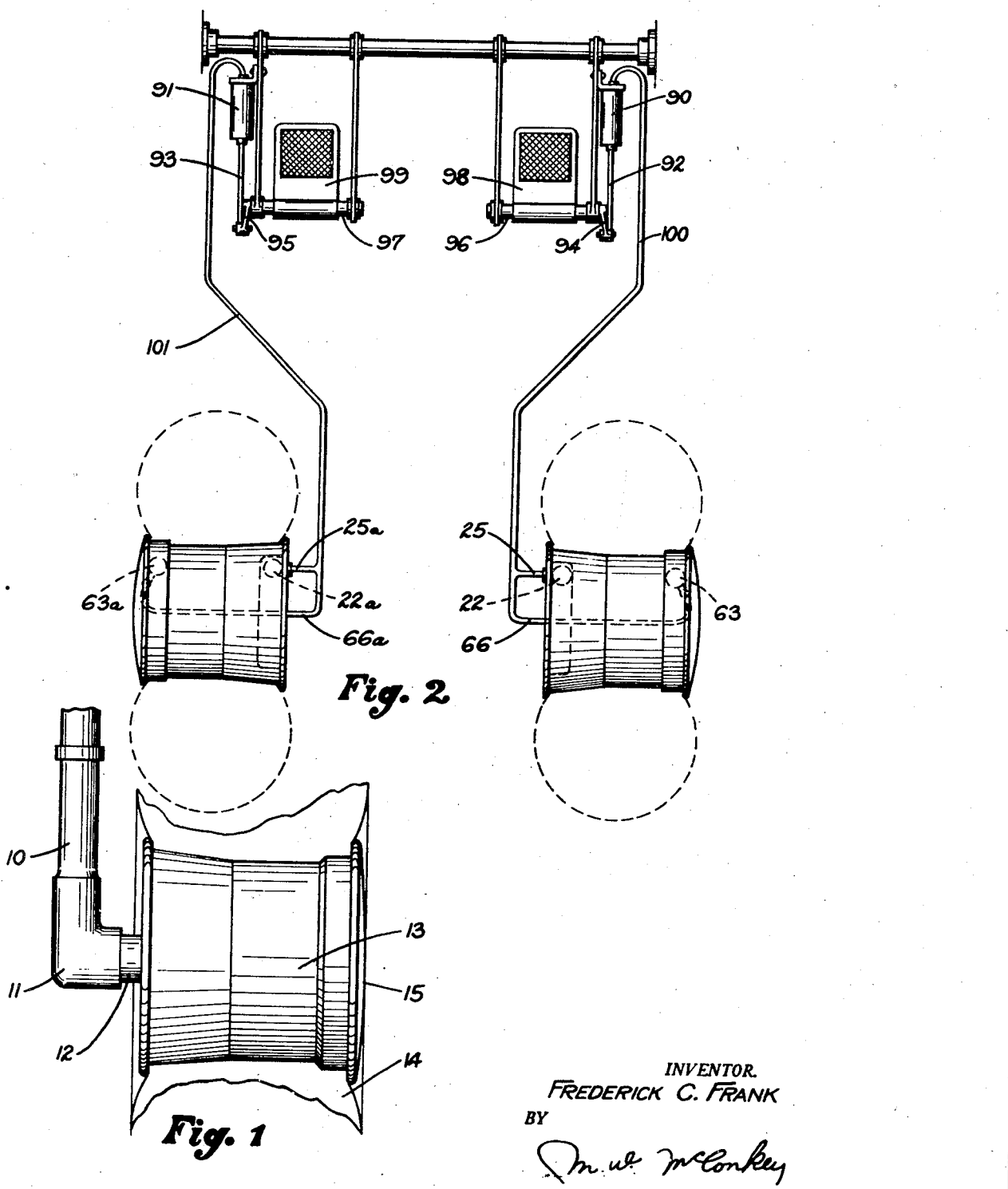
INVENTOR.
FREDERICK C. FRANK
BY Nov. 25, 1947. F. C. FRANK 2,431,667
BRAKE FOR AIRPLANE WHEELS
Original Filed March 8, 1940 2 Sheets-Sheet 2

INVENTOR.
FREDERICK C. FRANK
BY
M. W. McConkey

Patented Nov. 25, 1947

2,431,667

UNITED STATES PATENT OFFICE 2,431,667

BRAKE FOR AIRPLANE WHEELS

Frederick C. Frank, South Bend, Ind., assignor to Bendix Aviation Corporation, South Bend, Ind., a corporation of Delaware Original application March 8, 1940, Serial No. 322,881. Divided and this application January 27, 1943, Serial No. 473,662

6 Claims. (Cl. 188—18)

This invention relates to brakes, particularly to brakes for aircraft, and more particularly to the supporting or torque-taking structure for aircraft brakes. This application is a division of my copending application, Serial Number 322,881, filed March 8, 1940, now Patent No. 2,313,223, dated March 9, 1943.

In modern airplane designing, it has been found desirable to provide means for lessening the air resistance occasioned by the air blowing against the surface of wheels and landing gear of planes while they are in flight. Thus it has become common to retract the landing gear (i. e., to fold the wheel unit under the plane after the take-off). With the bicycle type landing gear the only folding possible is straight back, allowing a considerable portion of the wheel to protrude.

Use of a cantilever axle for each wheel obviates this problem since the wheel unit may then be folded in any direction, the practical method being to fold it up under the corresponding wing of the airplane. A satisfactory and desirable streamlining effect is thus secured.

The cantilever axle demands, however, a new approach to the brake problem. Due to the large amount of heat generated by the friction required for stopping the airplane in a short enough space once it has been landed, a large amount of braking surface must be provided. To do this, dual brakes have been used, one on each side of each airplane wheel. This supplies a relatively large friction surface for the brakes without requiring inordinately large wheels and brake drums.

With the bicycle type landing gear, the dual brakes could be provided relatively easily, since one brake was fixed to each fork of the gear, and the torque developed by each brake was transmitted to its corresponding fork. When it was desired to remove or attach a wheel, the landing gear and front end of the plane could be raised and the wheel and axle unit removed or attached from below.

With the use of a cantilever axle, the provision of a dual brake assembly presents a more difficult problem. The outer brake, (i. e., one away from the vertical axle or gear) must be secured in some manner to the end of the axle which protrudes through the wheel, and must be removed every time the wheel is removed. This necessitates both a method for securing the outer brake to the rest of the wheel assembly and a means for removing the brake and wheel without undue complications.

Therefore, an object of my invention is to provide means for securing the outer brake to the cantilever axle.

A further object is to provide means for maintaining the assembled structure, including the inboard and outboard brake and the wheel and wheel bearings, securely attached to and properly spaced along the cantilever axle.

The above and other objects and features of my invention will be further evident in connection with the following detailed description. In the accompanying drawings, submitted to illustrate but not to limit my invention:

Figure 1 is a front view of an airplane wheel and axle assembly, the axle being of the abovementioned cantilever type;

Figure 2 is a diagrammatic sketch showing a hydraulic brake system applied to an airplane and including the dual wheel brakes of Figure 3.

Figure 3:
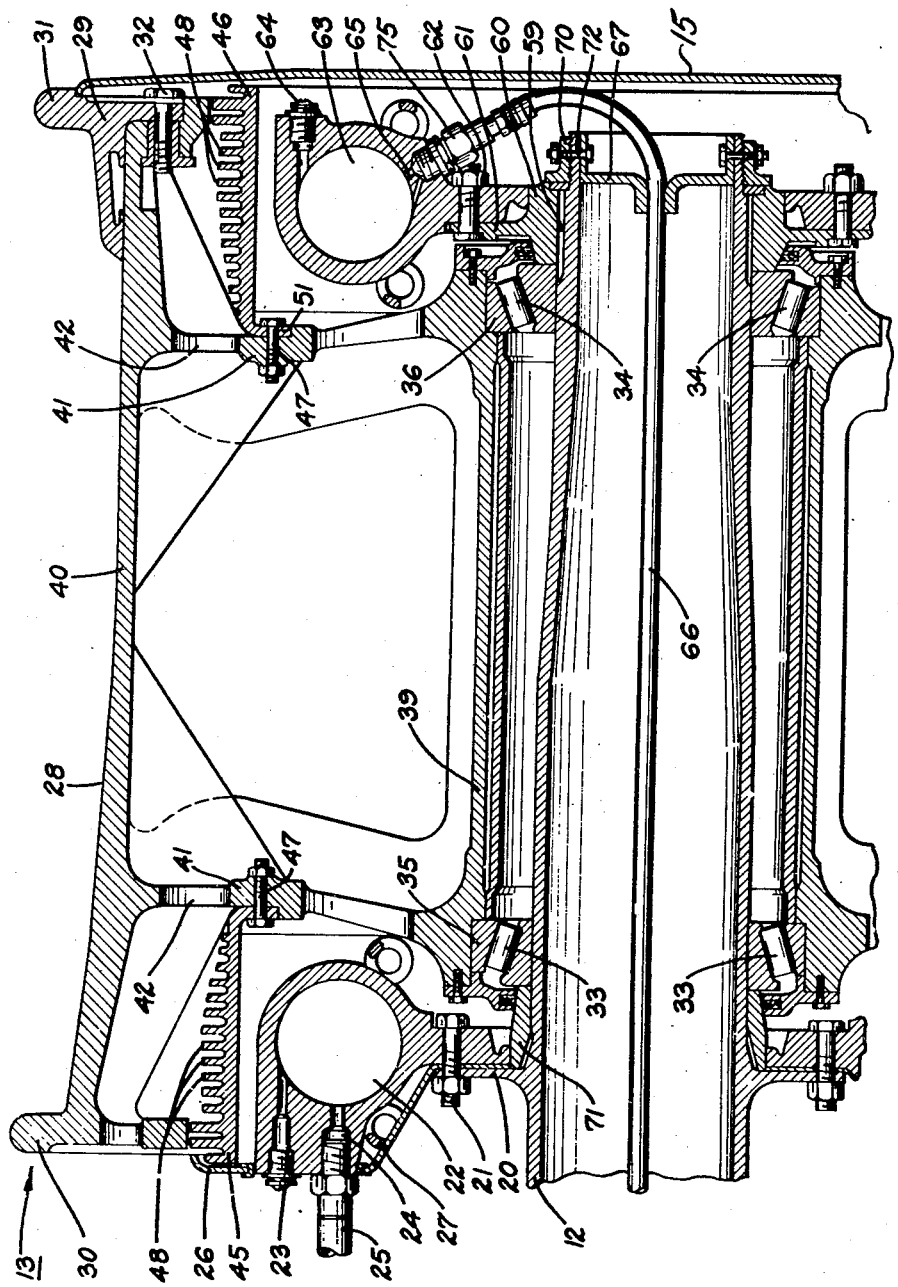
Figure 3 is a vertical cross section of the wheel and brake assembly.

Referring now to the parts specifically, Figure 1 shows a cantilever axle and wheel assembly for an airplane. Extending down from the frame of an airplane, not shown, is a wheel-carrying element constituted by a vertical portion, or strut, 10 and a horizontal portion or tubular axle, 12. Arranged to rotate about the horizontal portion, or axle 12 is a wheel 13, carrying a tire 14. A fairing plate 15 is pressed into the outer portion of the wheel to serve as a protective covering against dust and other extraneous matter.

Figure 2 shows diagrammatically the hydraulic brake system of an airplane with dual brakes on each wheel constructed and assembled according to my invention. A pair of master cylinders 90 and 91 are arranged to be actuated by the manipulation of rods 92 and 93 which are attached respectively to levers 94 and 95. The levers 94 and 95 are attached to rotatable shafts 96 and 97 adapted to be turned by manipulation of pedals 98 and 99. Actuation of the master cylinders 90 and 91 forces pressure fluid through conduits 100 and 101 respectively to branch conduits thereof, which conduct the fluid to wheel cylinders. Conduit 100 has a branch conduit 25 leading to a wheel cylinder 22 and a branch conduit 66 leading to a wheel cylinder 63. Conduit 101 has a branch conduit 25a leading to a wheel cylinder 22a and a branch conduit 66a leading to a wheel cylinder 63a. The pressure fluid entering the wheel cylinders under the force applied at the master cylinders spreads the brake shoes to apply the brakes in a manner well known to the art and not believed to require detailed description here.

In Figure 3, an axle and wheel assembly is shown in cross section. The same assembly is used for both wheels and only one need be described. The tubular axle 12 is provided with a flange 20 to which is secured by suitable means, as shown at 21, the hydraulic wheel cylinder 22. The cylinder 22 is provided with a bleeder plug 23 and a port 24 to which is connected the conduit 25 connected at its other end to the hydraulic master cylinder 90 (see Figure 2). Fluid entering cylinder 22 from conduit 25 actuates brake shoes (not shown) to apply the brakes. Thin covers shown at 26 and 27 protect the inner side of the wheel and brake assembly from dust and dirt.

The elements thus for described constitute the means for applying the inner brake of the dual brakes herein shown, that is, the brake nearest the vertical portion of the wheel-carrying element 10.

The wheel 13 is cast in two sections 28 and 29, section 28 constituting the main body of the wheel. Section 28 is provided with an annular tire engaging rim 40 and has a flange 30 for retaining the inner wall of tire 14, while section 29 of the wheel has a flange 31 for retaining the outer wall of the tire. Sections 28 and 29 of wheel 13 are held together by a plurality of bolts 32 or by other suitable means.

Section 28, or the main body of the wheel, has a hub 39 and side walls 41 with sections 42 cut out to decrease the weight of the wheel.

Roller bearings 33 and 34 are provided, arranged in suitable bearing assemblies, as shown at 35 and 36, to allow the rotation of wheel 13 about stationary axle 12 with a minimum of friction.

The wheel is provided with dual brake drums 45 and 46 having flanges 50 and 51 fixed to the respective side walls of the wheel by a plurality of bolts 47. The brake drums are each provided with a series of cooling fins 48 to facilitate dissipation of the heat generated during braking.

The remainder of the assembly consists of the outer of the dual brakes and the means used for fixing that brake to the axle 12 together with means for actuating the brake.

The axle 12 is provided with a plurality of grooves 59 to receive the complementary projections of a splined brake carrier 60. This brake carrier is provided with an annular flange 61 to which is secured by suitable means, as shown at 62, the hydraulic wheel cylinder 63. The cylinder 63 is provided with a bleeder plug 64 and a port 65, which communicate with the conduit 66. The conduit 66 passes through the hollow center of the axle 12 and is connected to the conventional master cylinder 90, to which is also connected the conduit 25. An annular flexible web or diaphragm 67 near the outer end of the axle supports conduit 66.

When the whole wheel and brake assembly is fitted on the axle, it is maintained in position between the flange 20 of the axle 12 and a retaining nut 70 which is screwed onto the outer end of the axle. There is, therefore, an adjustable tension holding, against lateral movement, the elements constituting the wheel and brake assembly. The juxtaposed elements consist, starting at the inner end of the wheel, of the flange 20, an annular spacer, or abutment-providing member, 71, bearing assembly 35, the hub 39 of the wheel, bearing assembly 36, the splined brake carrying flange 60, and retaining nut 70. The retaining nut is held against turning by a plurality of bolts 72, which also serve to hold in place the web or diaphragm 67 for supporting the conduit 66 centrally within the axle 12.

When the brakes are desired to be applied, fluid pressure is transmitted from the master cylinder, through conduits 25 and 66, to the wheel cylinders 22 and 63, causing the application of the brakes in a well-known manner.

Connected between the end of conduit 66 and cylinder 63 is a cut-off valve 75, which is arranged to allow disconnection of conduit 66 from cylinder 63 without the loss of liquid or ingress of air into the hydraulic system. This is especially advantageous in view of the necessity, when cantilever wheel-carrying element 10—12 is combined with dual brakes (as shown), of disconnecting the conduit 66 from the cylinder 63 and removing the cylinder and its splined carrier from the axle whenever the wheel 13 is to be removed from the plane. Use of the valve 75 eliminates the necessity for bleeding the hydraulic system each time the wheel is taken off.

The device described herein is capable of numerous uses and modifications readily apparent to those skilled in the art without departing from the scope of my invention. It is therefore my desire and intention not to be limited in the scope of my invention otherwise than by the terms of the appended claims.

What I claim is:

1. In combination with a wheel, an axle therefor and a support for maintaining said axle against rotation, bearings adjacent the ends of said wheel for supporting said wheel on said axle for rotation thereabout, a spacer sleeve on said axle between said wheel and said axle support, a fixed radial flange against which said sleeve abuts, a brake member supported by said flange, said spacer sleeve being in engagement with the inner periphery of said brake member, a brake carrier sleeve at the opposite end of said wheel splined to said axle, a radially extending flange on said brake carrier sleeve, a second brake member supported by said brake carrier sleeve flange, said brake carrier sleeve being in engagement with the inner periphery of said second brake member, said bearings having inner and outer races, said wheel having shoulders for receiving said outer races for limiting inner movement of said outer races with respect to said wheel, one of said sleeves being in end contact with one of said inner races and the other of said sleeves being in end contact with the other of said inner races, means supported with respect to said axle for clamping said brake carrier sleeve against its engaging inner race and for axially moving said wheel to cause said other inner race to clamp said spacer sleeve against the first-mentioned radial flange whereby said sleeves and brake members are maintained in fixed relation with respect to said axle and axle support while at the same time permitting rotation of said wheel.

2. In combination with a wheel, an axle therefor and a support for maintaining said axle against rotation, bearings adjacent the ends of said wheel for supporting said wheel on said axle for rotation thereabout, a spacer sleeve on said axle between said wheel and said axle support, a fixed radial flange against which the sleeve abuts, a brake member supported by said flange, a brake carrier sleeve at the opposite end of said wheel splined to said axle, a radially extending flange on said brake carrier sleeve, a second brake member supported by said brake carrier sleeve flange, said bearings having inner and outer races, said wheel having shoulders for receiving said outer races for limiting inner movement of said outer races with respect to said wheel, one of said sleeves being in end contact with one of said inner races and the other of said sleeves being in end contact with the other of said inner races, means supported with respect to said axle for clamping said brake carrier sleeve against its engaging inner race and for axially moving said wheel to cause said other inner race to clamp said spacer sleeve against the first-mentioned radial flange whereby said sleeves and brake members are maintained in fixed relation with respect to said axle and axle support while at the same time permitting rotation of said wheel.

3. In combination with a wheel and a non-rotatable wheel-carrying element including an axle about which the wheel rotates, bearings adjacent the ends of said wheel for supporting said wheel on said axle, a radial flange on said wheel-carrying element at the inboard side of the wheel, a spacer sleeve on said axle between said wheel and said radial flange, a brake member supported by said flange, said spacer sleeve being in engagement with the inner periphery of said brake member, a brake carrier sleeve at the opposite end of said wheel splined to said axle, a radially extending flange on said brake carrier sleeve, a second brake member supported by said brake carrier sleeve flange, said brake carrier sleeve being in engagement with the inner periphery of said second brake member, said bearings having inner and outer races, said wheel having shoulders for receiving said outer races for limiting inner movement of said outer races with respect to said wheel, one of said sleeves being in end contact with one of said inner races and the other of said sleeves being in end contact with the other of said inner races, and a retaining member supported with respect to said axle for clamping said brake carrier sleeve against its engaging inner race and for axially moving said wheel to cause said other inner race to clamp said spacer sleeve against the radial flange on the wheel-carrying element whereby said sleeves and brake members are maintained in fixed relation with respect to said wheel-carrying element while at the same time permitting rotation of said wheel.

4. In combination with a wheel and a non-rotatable wheel-carrying element, bearings adjacent the ends of said wheel for supporting said wheel on said element, a radial flange on said wheel-carrying element at the inboard side of the wheel, a spacer sleeve on said element between said wheel and said flange, a brake member supported by said flange, a brake carrier sleeve at the opposite end of said wheel splined to said wheel-carrying element, a radially extending flange on said brake carrier sleeve, a second brake member supported by said brake carrier sleeve flange, said bearings having inner and outer races, said wheel having shoulders for receiving said outer races for limiting inner movement of said outer races with respect to said wheel, one of said sleeves being in end contact with one of said inner races and the other of said sleeves being in end contact with the other of said inner races, and a retaining member supported with respect to said wheel carrying element for clamping said brake carrier sleeve against its engaging inner race and for axially moving said wheel to cause said other inner race to clamp said spacer sleeve against the radial flange on the wheel-carrying element whereby said sleeves and brake members are maintained in fixed relation with respect to said wheel-carrying element while at the same time permitting rotation of said wheel.

5. In combination with a wheel and a non-rotatable wheel-carrying element, bearings adjacent the ends of said wheel for supporting said wheel on said element, a radial flange on said wheel-carrying element at the inboard side of the wheel, an abutment provided on said wheel-carrying element between said wheel and said flange, a brake member supported by said flange, a brake carrier sleeve at the opposite end of said wheel splined to said wheel-carrying element, a radially extending flange on said brake carrier sleeve, a second brake member supported by said brake carrier sleeve flange, said bearings having inner and outer races, said wheel having shoulders for receiving said outer races for limiting inner movement of said outer races with respect to said wheel, said abutment being in end contact with one of said inner races and said brake carrier sleeve being in end contact with the other of said inner races, and a retaining member supported with respect to said wheel-carrying element for clamping said brake carrier sleeve against its engaging inner race and for axially moving said wheel to cause said other inner race to engage said abutment.

6. In combination with a wheel and a non-rotatable wheel-carrying element, bearings adjacent the ends of said wheel for supporting said wheel on said element, a radial flange on said wheel-carrying element at the inboard side of the wheel, an abutment provided on said wheel-carrying element between said wheel and said flange, a brake member supported by said flange, said abutment being in engagement with the inner periphery of said brake member, a brake carrier sleeve at the opposite end of said wheel splined to said wheel-carrying element, a radially extending flange on said brake carrier sleeve, a second brake member supported by said brake carrier sleeve flange, said brake carrier sleeve being in engagement with the inner periphery of said second brake member, said bearings having inner and outer races, said wheel having shoulders for receiving said outer races for limiting inner movement of said outer races with respect to said wheel, said abutment being in end contact with one of said inner races and said brake carrier sleeve being in end contact with the other of said inner races, and a retaining member supported with respect to said wheel-carrying element for clamping said brake carrier sleeve against its engaging inner race and for axially moving said wheel to cause said other inner race to engage said abutment.

FREDERICK C. FRANK.

REFERENCES CITED

The following references are of record in the file of this patent:

UNITED STATES PATENTS

| Number | Name | Date |
| --- | --- | --- |
| 2,296,671 | Hollerith | Sept. 22, 1942 |
| 2,082,292 | Kendall | June 1, 1937 |
| 2,194,853 | Hatch et al. | Mar. 26, 1940 |
| 2,246,979 | Kraft et al. | June 24, 1941 |
| 2,248,171 | Hatch | July 8, 1941 |
| 2,124,773 | Frank | July 26, 1938 |

FOREIGN PATENTS

| Number | Country | Date |
| --- | --- | --- |
| 545,558 | Germany | Mar. 3, 1932 |
| 471,117 | Great Britain | Aug. 24, 1937 |